(12) United States Patent
Kull et al.

(10) Patent No.: US 10,221,915 B2
(45) Date of Patent: Mar. 5, 2019

(54) SYSTEMS AND METHODS FOR PISTON ASSEMBLIES

(71) Applicant: STABILUS, INC., Gastonia, NC (US)

(72) Inventors: James T. Kull, Denver, NC (US); Patrick Hartman, Belmont, NC (US); Alan Jolley, Gastonia, NC (US)

(73) Assignee: STABILUS, INC., Gastonia, NC (US)

( * ) Notice: Subject to any disclaimer, the term of this patent is extended or adjusted under 35 U.S.C. 154(b) by 327 days.

(21) Appl. No.: 15/159,983

(22) Filed: May 20, 2016

(65) Prior Publication Data

US 2016/0265619 A1   Sep. 15, 2016

Related U.S. Application Data

(63) Continuation of application No. PCT/US2014/066924, filed on Nov. 21, 2014.

(Continued)

(51) Int. Cl.
*F16F 9/348* (2006.01)
*F16F 13/00* (2006.01)
(Continued)

(52) U.S. Cl.
CPC ............ *F16F 13/007* (2013.01); *E05C 17/30* (2013.01); *E05F 1/1025* (2013.01); *E05F 3/02* (2013.01);
(Continued)

(58) Field of Classification Search
CPC .... F16F 9/02; F16F 9/0254; F16F 9/34; F16F 9/56; F16F 9/516
(Continued)

(56) References Cited

U.S. PATENT DOCUMENTS 1,616,091 A    2/1927   Scott
4,503,951 A *  3/1985   Imaizumi ................ F16F 9/516
                                                188/280

(Continued)

FOREIGN PATENT DOCUMENTS

DE    19820404 A1    2/1999
FR    1419551 A      12/1965

OTHER PUBLICATIONS

Supplementary European Search Report dated Jun. 21, 2017 in Application No. EP14864144.

(Continued)

*Primary Examiner* — Christopher P Schwartz
(74) *Attorney, Agent, or Firm* — Baker Botts L.L.P.

(57) ABSTRACT

Piston assembly includes a piston housing defining an interior and having a first housing end and a second housing end, a piston rod having a first rod end extending into the interior and moveable therein between an extended position toward the first housing end and a retracted position toward the second housing end, a first plate joined to the piston rod proximate the first rod end, a second plate joined to the piston rod and spaced apart a distance along the piston rod from the first plate, and a piston head slidably joined to the piston rod between the first plate and the second plate. A lift assembly including a piston assembly and configured to provide a damping force to a pivotable body during pivoting of the pivotable body relative a stationary body between a closed position and an open position is provided.

20 Claims, 7 Drawing Sheets

Related U.S. Application Data

(60) Provisional application No. 61/907,009, filed on Nov. 21, 2013.

(51) Int. Cl.

| | | |
|---|---|---|
| *E05C 17/30* | (2006.01) | |
| *E05F 3/02* | (2006.01) | |
| *E05F 3/10* | (2006.01) | |
| *F16F 9/512* | (2006.01) | |
| *E05F 3/18* | (2006.01) | |
| *E05F 1/10* | (2006.01) | |
| *E05F 3/22* | (2006.01) | |

(52) U.S. Cl.
CPC ............... *E05F 3/10* (2013.01); *E05F 3/108* (2013.01); *E05F 3/18* (2013.01); *F16F 9/5126* (2013.01); *E05F 1/1091* (2013.01); *E05F 3/22* (2013.01); *E05Y 2900/516* (2013.01); *E05Y 2900/536* (2013.01)

(58) Field of Classification Search
USPC ............ 267/64.12, 120, 221–226, 291, 293; 188/67, 300; 16/49, 66, 82
See application file for complete search history.

(56) References Cited

U.S. PATENT DOCUMENTS

| | | | | |
|---|---|---|---|---|
| 4,632,228 A | * | 12/1986 | Oster | ........................ F16F 9/56 188/282.1 |
| 4,964,493 A | * | 10/1990 | Yamaura | ............... F16F 9/3484 188/280 |
| 5,028,037 A | * | 7/1991 | Wang | ........................ A47C 3/30 267/64.13 |
| 5,095,581 A | | 3/1992 | Sarto | |
| 5,450,933 A | * | 9/1995 | Schuttler | ................. E05C 17/30 188/300 |
| 5,487,454 A | | 1/1996 | Klembczyk et al. | |
| 5,535,861 A | * | 7/1996 | Young | ........................ F16F 7/09 188/129 |
| 5,788,372 A | | 8/1998 | Jones et al. | |
| 5,911,290 A | | 6/1999 | Steed | |
| 6,135,434 A | * | 10/2000 | Marking | ................. F16F 9/062 188/315 |
| 6,179,100 B1 | | 1/2001 | Mintgen et al. | |
| 6,234,461 B1 | * | 5/2001 | Bohm | ................... F16F 9/0245 267/123 |
| 7,387,181 B2 | * | 6/2008 | Adoline | ................ F16F 9/0254 180/69.21 |
| 7,975,994 B2 | | 7/2011 | Born et al. | |
| 9,206,873 B2 | * | 12/2015 | Kull | ....................... F16F 9/0254 |
| 2003/0213663 A1 | * | 11/2003 | Salice | ........................ E05F 5/02 188/284 |
| 2004/0113341 A1 | | 6/2004 | McConnell et al. | |
| 2004/0245058 A1 | | 12/2004 | Diederich et al. | |

OTHER PUBLICATIONS

International Search Report and Written Opinion dated Mar. 3, 2015 in International Application No. PCT/US14/66924.

* cited by examiner

SYSTEMS AND METHODS FOR PISTON ASSEMBLIES

CROSS-REFERENCE TO RELATED APPLICATIONS

This application is a continuation of International Patent Application No. PCT/US2014/066924, filed Nov. 21, 2014, which claims priority to U.S. Provisional Patent Application No. 61/907,009, filed on Nov. 21, 2013, each of which is incorporated by reference herein in its entirety.

BACKGROUND

The present application relates to systems and methods for piston assemblies, including such assemblies that can be used in a lift mechanism for assisting with opening and closing of a large pivoting body, for example and without limitation a hood for a class 8 truck.

An exemplary lift mechanism can include a lockable gas spring arrangement, for example as shown and described in U.S. Patent Application Publication No. 2013/0187315, which is incorporated by reference herein in its entirety. In operation, the piston assembly of the lift mechanism can provide a damped force to a large pivoting body, for example and without limitation a hood for a class 8 truck, over a range of motion of the large pivoting body between an open position and a closed position. When a lift mechanism is attached to a large pivoting body, such as a hood of a truck, during operation of the truck, the hood can be subjected to vibration that can be transferred to the lift mechanism. In this manner, the piston assembly of the lift mechanism can provide a damping force in response to the vibration, which can result in increased wear to the hood and lift mechanism.

As such, there is an opportunity for an improved piston assembly that can be used in a lift mechanism for assisting with opening and closing of a large pivoting body, while reducing or preventing wear on the lift mechanism due to vibrational forces.

SUMMARY

Systems and methods for piston assemblies are disclosed herein.

In accordance with the disclosed subject matter, a piston assembly is provided. The piston assembly includes a piston housing defining an interior and having a first housing end and a second housing end, a piston rod having a first rod end extending into the interior and moveable therein between an extended position toward the first housing end and a retracted position toward the second housing end, a first plate joined to the piston rod proximate the first rod end, a second plate joined to the piston rod and spaced apart a distance along the piston rod from the first plate, and a piston head slidably joined to the piston rod between the first plate and the second plate.

In some embodiments, the piston assembly can include a first energy storage member disposed within the housing proximate the first housing end, and can include a second energy storage member disposed proximate the second housing end. At least one of the first and second energy storage members can include a spring. When the piston rod is in the extended position, the first plate can engage the first energy storage member, and when the piston rod is in the retracted position, the second plate can engage the second energy storage member. When the piston rod is urged from the extended position toward the retracted position, the piston head can slide along the piston rod from the first plate toward the second plate.

In some embodiments, the piston assembly can include a sleeve surrounding at least a portion of the piston rod and having a first sleeve end and a second sleeve end. The first plate can be fixed to the sleeve proximate the first sleeve end. The second plate can be fixed to the sleeve proximate the second sleeve end. The piston head can be slidable along the sleeve between the first and second plates. The sleeve can have an outer diameter greater than the first rod end and less than a remainder of the piston rod.

In some embodiments, the piston assembly can include a fastener disposed proximate the first rod end to limit or inhibit movement of at least the first plate toward the first rod end. The first rod end can have a reduced diameter relative a remainder of the piston rod.

In some embodiments, each of the first and second plates can include a washer. Each of the first and second plates can include a notched washer. Alternatively, at least one of the first plate and second plate can include a disc washer. Additionally or alternatively, the at least one of the first plate and second plate can include an aperture defined therethrough. The aperture can have a cross dimension selected to provide a selected amount of damping to the piston rod when the piston head is in an intermediate position between the first plate and the second plate. When the piston head is urged from the intermediate position to the retracted position, a first amount of damping can be provided to the piston rod, and the first amount of damping can be greater than the selected amount of damping. The first place can include a disc washer and the second plate can include a notched washer. Alternatively, the second place can include a disc washer and the first place can include a notched washer. As a further alternative, the first place and the second plate can each include a disc washer.

In accordance with other aspects of the disclosed subject matter, a lift assembly configured to provide a damping force to a pivotable body during pivoting of the pivotable body relative a stationary body between a closed position and an open position is provided. The lift assembly can have a first lift end and a second lift end. The lift assembly includes a piston assembly. The piston assembly can include any and all of the features described herein. The lift assembly includes a first fitting operably coupled to the piston assembly proximate the first lift end and configured to engage the pivotable body. The lift assembly includes a second fitting operably coupled to the piston assembly proximate the second lift end and configured to engage the stationary body.

In some embodiments, when the first fitting is engaged to the pivotable body and the second fitting is engaged to the stationary body, and when the pivotable body is urged from the closed position toward the open position to an intermediate position, the lift assembly can provide no damping force to the pivotable body. When the pivotable body is further urged from the intermediate position toward the open position, the lift assembly can provide a damping force to the pivotable body. When the pivotable body is urged from the open position to the intermediate position, the lift assembly can provide a damping force to the pivotable body. When the pivotable body is urged from the intermediate position toward the closed position, the lift assembly can provide no damping force to the pivotable body.

Certain variations of the subject matter disclosed herein are set forth in the accompanying drawings and further description below. Other features and advantages of the subject matter described herein will be apparent from the description and drawings, and from the claims.

DETAILED DESCRIPTION

According to aspects of the disclosed subject matter, systems and techniques for piston assemblies generally include a piston housing, a piston rod disposed at least partially within the piston housing, a first plate joined to the piston rod, a second plate joined to the piston rod and spaced apart from the first plate, and a piston head joined to the piston rod and slidable between the first plate and the second plate.

Piston assemblies according to the disclosed subject matter can be used in a lift mechanism for assisting with opening and closing of a large pivoting body joined to a stationary body. For purpose of illustration only and not limitation, the stationary body can be a vehicle, such as a class 8 truck, and the large pivoting body can be a hood for the class 8 truck. An exemplary lift mechanism can include a lockable gas spring arrangement, for example as shown and described in U.S. Patent Application Publication No. 2013/0187315, which is incorporated by reference herein in its entirety.

Figure 1:
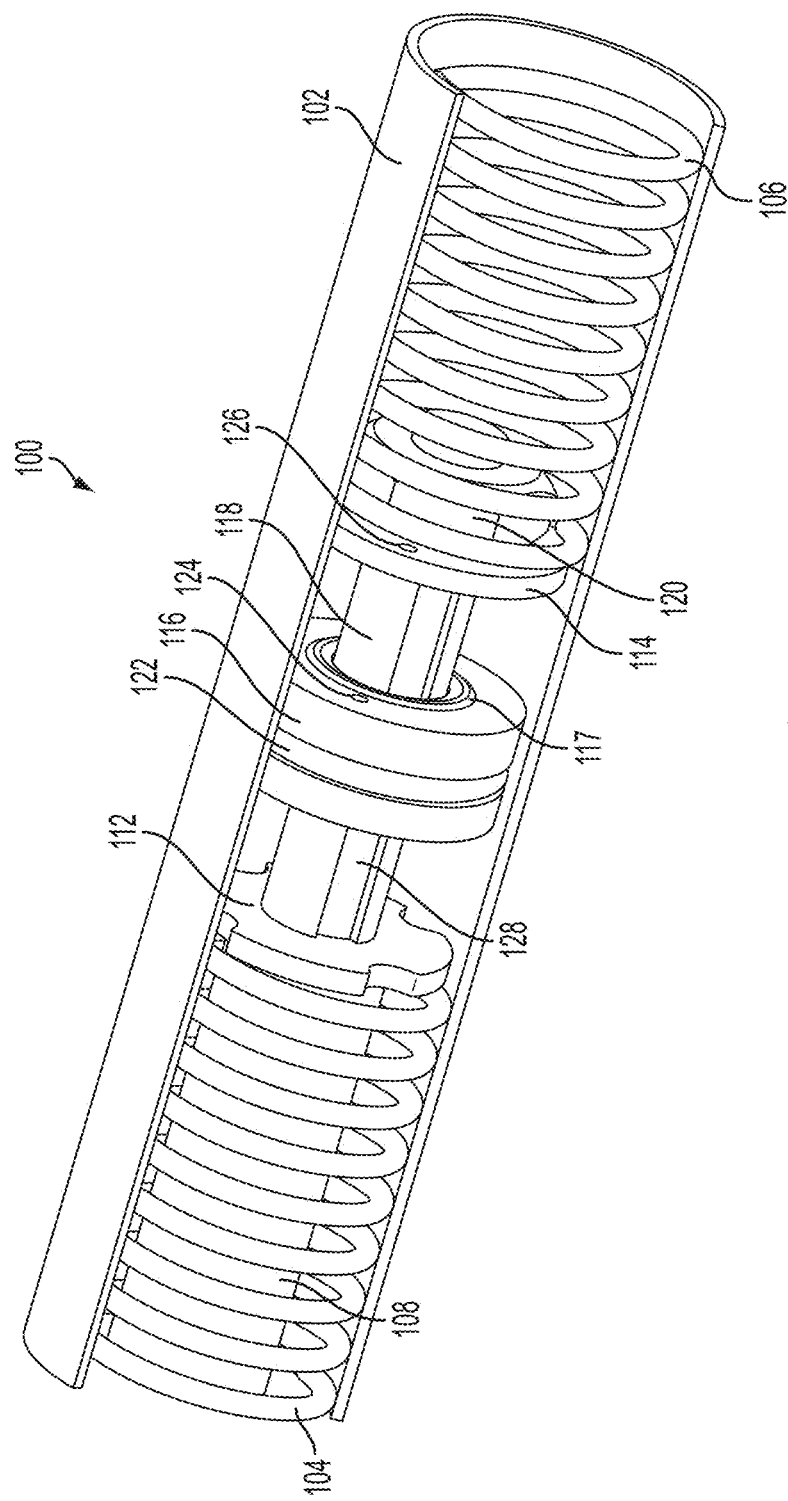
FIG. 1 is a perspective view of an exemplary embodiment of a piston assembly in accordance with the disclosed subject matter, with portions of the housing cut away for purpose of illustration.
Figure 2:
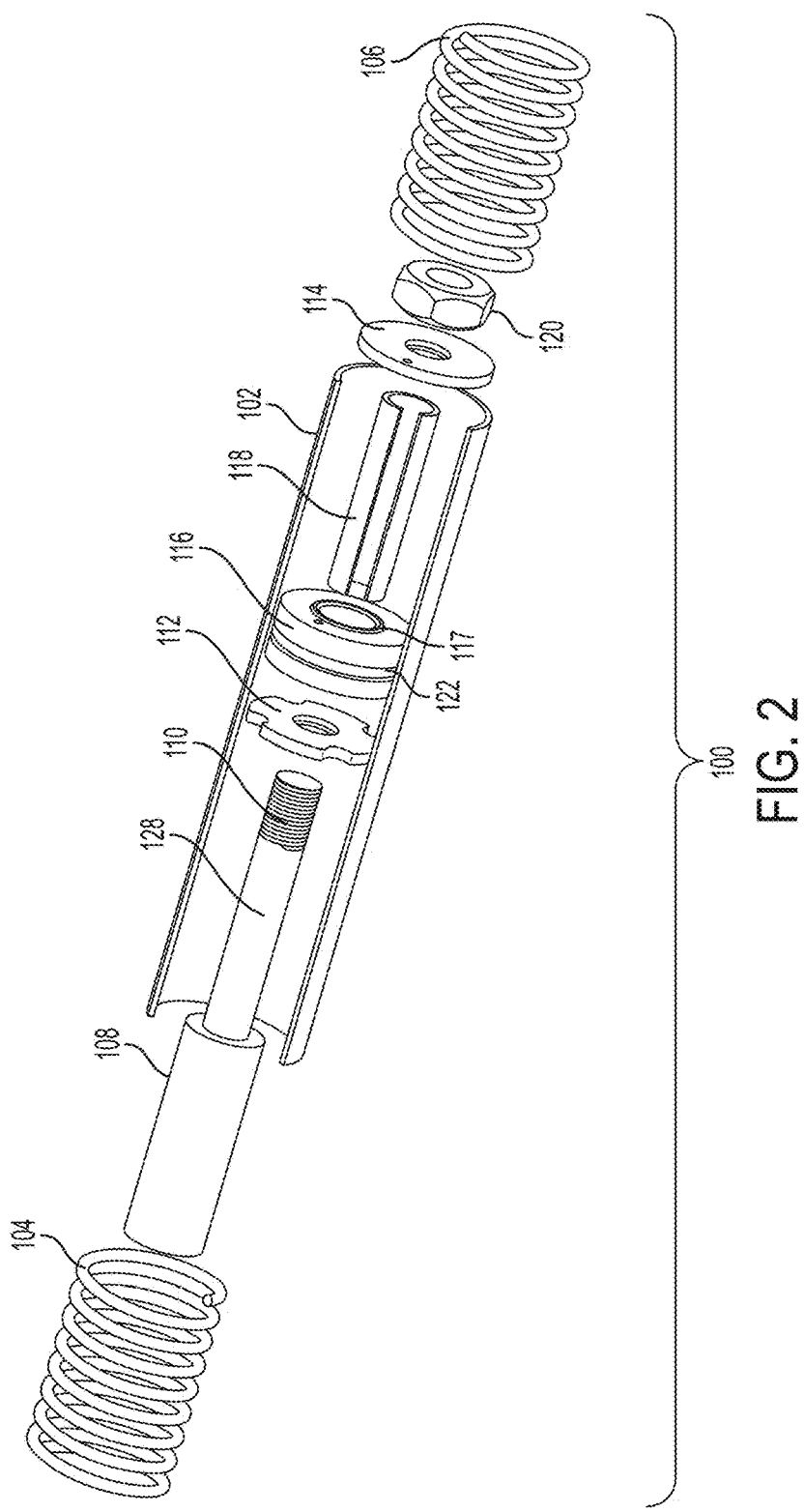
FIG. 2 is an exploded perspective view of the piston assembly of FIG. 1, with portions of the housing cut away for purpose of illustration.

With reference to FIGS. 1 and 2, an exemplary piston assembly 100 according to the disclosed subject matter is illustrated. The piston assembly 100 includes a piston housing 102 defining an interior and having a first housing end and a second housing end. The piston housing 102 can be configured as a closed housing, and as such, can be filled with a fluid medium, including but not limited to, air, compressed gas, oil or any other suitable medium. Piston housing 102 can be any suitable shape. For example, and as embodied herein, piston housing 102 can be cylindrical.

Additionally, and as embodied herein, piston assembly 100 includes a piston rod 108 extending at least partially into the interior of piston housing 102. As embodied herein, piston rod 108 can has a first rod end 128 extending into the interior of piston housing 102. Piston rod 108 can have any suitable size and shape. For example, and as embodied herein, first rod end 128 can have a diameter less than a diameter of a remainder of piston rod 108. For purpose of illustration, and not limitation, first rod end 128 can have a diameter within a range of 4 mm to 16 mm, and as embodied herein can have a diameter of 8 mm, and the remainder of piston rod 108 can have a diameter within a range of 6 mm to 20 mm, and as embodied herein can have a diameter of 14 mm. Alternatively, piston rod 108 can have a constant diameter along its length.

Furthermore, and as embodied herein, piston rod 108 can include one or more engagements to secure one or more components of piston assembly 100 to piston rod 108. For example, and as embodied herein, piston rod 108 can include an engagement region 110 proximate first rod end 128. Engagement region 110 can be any suitable engagement, and for purpose of illustration and not limitation, engagement region can be a threated engagement.

In addition, and as embodied herein, piston assembly 100 includes a first plate 114 joined to the piston rod 108 proximate the first rod end 128. Piston assembly 100 further includes a second plate 112 joined to the piston rod 108 and spaced apart a distance along the piston rod 108 from the first plate 114. For purpose of illustration, and not limitation, first plate 114 can be spaced apart a distance within a range of 5 mm to 100 mm from second plate 112, and as embodied herein can be spaced apart a distance of 10 mm from second plate 112. First and second plates 112, 114 can have any suitable configuration. For example, and as embodied herein, first plate 114 and second plate 112 each can be configured as washers. With reference to FIGS. 1 and 2, as embodied herein, first plate 114 can be configured as a disc washer. Additionally, and as embodied herein, second plate 112 can be configured as a notched washer. Alternatively, first plate 114 can be configured as a notched washer, and second plate 112 can be configured as a disc washer. As a further alternative, first and second plates 112, 114 each can be configured as a disc washer.

With continued reference to FIGS. 1 and 2, as embodied herein, piston assembly 100 includes a piston head 116 slidably joined to piston rod 108 between first plate 114 and second plate 112. In this manner, the distance between first plate 114 and second plate 112 defines a floating region within which piston head 116 can slide along piston rod 108, as discussed further herein. The length of free travel of piston head 116 can be selected and changed to increase or reduce the amount of undamped movement of the piston assembly 100 by increasing or decreasing the distance between the first plate 114 and second plate 112. For purpose of illustration and not limitation, the length of free travel of piston head 116 between first plate 114 and second plate 112 can be selected within a range of 5 mm to 100 mm, and as embodied herein, can be 10 mm. As embodied herein, piston head 116 can include a shoulder 117 protruding outwardly from one or both opposing surfaces thereof. For purpose of illustration, and not limitation, shoulder 117 can prevent locking of piston head 116 with first plate 114 or second plate 112, for example due to hydraulic locking.

Additionally, and as embodied herein, piston assembly 100 can include a sleeve 118 disposed at least partially about at least a portion of first rod end 128 of piston rod 108. Sleeve 118 can have an inner diameter sized to engage piston rod 108 in a frictional engagement. For purpose of illustration and not limitation, as embodied herein, sleeve 118 can have an inner diameter of 8 mm and an outer diameter of 10 mm. First and second plates 112, 114 can be joined to sleeve 118 by any suitable engagement. For example, first and second plates 112, 114 can have an inner diameter sized to engage outer diameter of sleeve 118 in a frictional engagement. For purpose of illustration and not limitation, as embodied herein, first and second plates 112, 114 can have an inner diameter of 10 mm. Alternatively, first and second plates 112, 114 can be joined to sleeve 118 by threaded engagement or any other suitable engagement. Piston head 116 can have an inner diameter sized to be disposed about and slide along sleeve 118. For purpose of illustration and not limitation, piston head 116 can have an inner diameter within a range of 4 mm to 16 mm, which can be selected to allow piston head 116 to slide along sleeve 118, if provided, and/or first rod end 128. Sleeve 118 can be formed of any suitable material, such as, for purpose of illustration and not limitation metals, such as steel or aluminum, or polymeric materials, such as plastic. Alternatively, first and second plates 112, 114 and piston head 116 can be joined directly to piston rod 108 without sleeve 118 disposed thereon. Additionally or alternatively, piston assembly 100 can include a fastener 120 secured to engagement region 110 of first rod end 128. For example, and not limitation, fastener 120 can be configured as a nut, such as a hexagonal nut.

Furthermore, and as embodied herein, first and second plates 112, 114 and piston head 116 each can have any suitable size to move within piston housing 102. For purpose of illustration and as embodied herein, one or more of first and second plates 112, 114 and piston head 116 can have an outer diameter similar to the inner diameter of piston housing 102. As such, first and second plates 112, 114 and/or piston head 116 can form a fluid-tight seal with piston housing 102. For example, and as embodied herein, first and second plates 112, 114 and piston head 116 each can have an outer diameter corresponding to inner diameter of piston housing 102. In this manner, damping forces can be provided by movement of first and second plates 112, 114 and/or piston head 116, as discussed further herein. For purpose of illustration and not limitation, first and second plates 112, 114 and piston head 116 each can have an outer diameter of 13 mm to 38 mm, which can be chosen to form a fluid-tight seal between any or all of these components and piston housing 102. Piston head 116 can further include a gasket 122 disposed therein. Gasket 122 can improve the fluid-tight seal formed between piston head 116 and piston housing 102. Gasket 122 can be formed from any suitable material to provide a fluid-tight seal, including but not limited to rubber, urethane, fluoroelastomer, nylon, polytetrafluoroethylene, or any other suitable material. First plate 112 and/or second plate 114 can also include a gasket to improve a fluid-tight seal formed between first plate 112 and/or second plate 114 and piston housing 102.

In addition, and as embodied herein, first plate 114 and/or second plate 112 can include an aperture defined therethrough. For example, and as embodied herein, first plate 114 can include aperture 126 defined therethrough. The size of aperture 126 can be selected to adjust an amount of damping provided by the movement of first plate 114 through the fluid medium in piston housing 102. For example, increasing the size of aperture 126 can reduce an amount of damping from movement of first plate 114, via movement of piston rod 108, as discussed further herein. Conversely, decreasing the size of aperture 126 can increase an amount of damping from movement of first plate 114. For purpose of illustration and not limitation, aperture 126 can have a diameter within a range of 0.1 mm and 3 mm. Additionally, first plate 112 can include a plurality of apertures 126 to further adjust the amount of damping. Additionally or alternatively, second plate 112 can include an aperture therethrough, which can have a diameter selected to further adjust damping from movement of second plate 112.

Referring still to FIGS. 1 and 2, piston assembly 100 can include one or more energy storage features to provide energy to first plate 114, second plate 112, and/or piston head 116. For purpose of illustration and not limitation, and as embodied herein, piston assembly 100 can include a first energy storage member 106 disposed between an end wall of piston housing 102 and first plate 114. Additionally, and as embodied herein, piston assembly 100 can include a second energy storage member 104 disposed between an opposing end wall of piston housing 102 and second plate 112. First and second energy storage members 104, 106 can be any suitable energy storage member. For example, and as embodied herein, first and second energy storage members 104, 106 each can be configured as a mechanical spring. Alternatively, one or both of first energy storage member 104 and second energy storage member 106 can be configured as a compressed gas, electromechanical energy storage, electromagnetic energy storage or any other suitable energy storage to provide a force to the first plate 104, second plate 106 or piston head 116.

Figure 3:
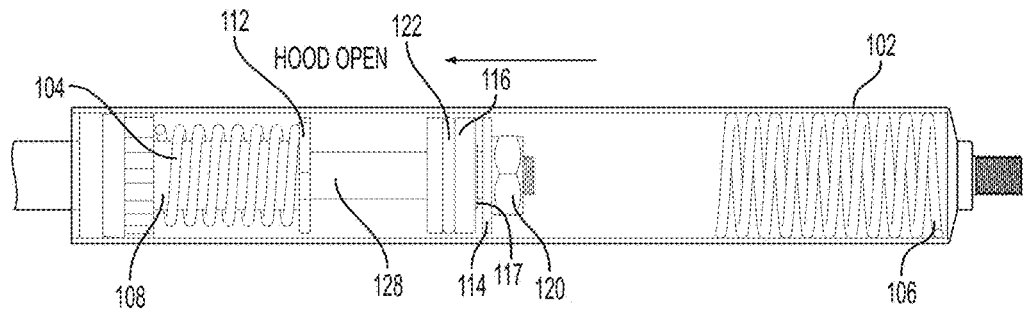
FIG. 3 is a cross-sectional view of the piston assembly of FIG. 1 in an open position.
Figure 4:
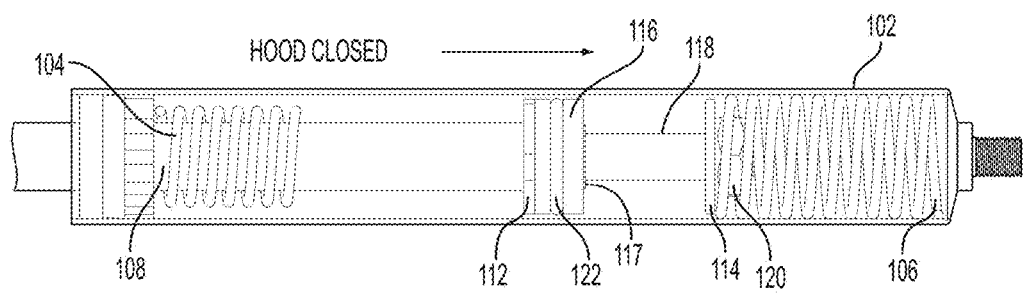
FIG. 4 is a cross-sectional view of the piston assembly of FIG. 1 in a closed position.
Figure 5:
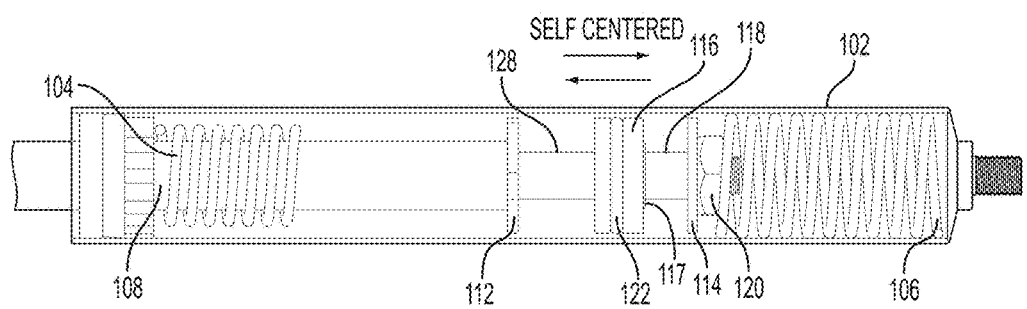
FIG. 5 is a cross-sectional view of the piston assembly of FIG. 1 in a centered position.

Referring now to FIGS. 3-5, exemplary operation of piston assembly 100 is illustrated. With reference to FIG. 3, piston assembly 100 is shown with piston rod 108 in a retracted position. For purpose of illustration and not limitation, the retracted position of piston rod 108 can correspond to an open position of a pivotable body joined to piston assembly 100. In the retracted position, second plate 112 engages second energy storage member 104, which can provide tension force, for example to slow the speed of the pivotable body moving from the closed position toward the open position and support the pivotable body in the open position.

With reference to FIG. 4, piston assembly 100 is shown with piston rod 108 in an extended position. When the pivotable body is urged toward the closed position, piston head 116 engages second plate 112 and damps the motion of piston rod 108. In the extended position, first plate 114 engages first energy storage member 106, which can provide a lifting force to urge the pivotable body toward the open position, for example to assist a user in opening the pivotable body. First energy storage member 106 can also slow the speed of the pivotable body moving from the open position to the closed position.

With reference to FIG. 5, piston assembly 100 is shown with piston rod 108 in an intermediate position between the extended position and retracted position. When the pivotable body is in the closed position, piston rod 108 can oscillate between the extended position and the intermediate position, which can occur for example and without limitation, and as embodied herein due to vibrational forces applied to the piston assembly 100. In the intermediate position, piston head 116 can float between first plate 114 and second plate 112. That is, piston head 116 can slide within the floating region defined between first plate 114 and second plate 112 without engaging either first plate 114 and second plate 112. In this manner, piston head 116 can be prevented or inhibited from applying damping force to the piston rod 108 and pivotable body. When the pivotable body is urged further toward the open position, for example by lifting the pivotable body by a user, second plate 112 engages piston head 116, which applies a damping force to piston rod 108, as illustrated for example in FIG. 3. As discussed herein, first plate 114 and second plate 112 can be selected and adjusted to allow piston assembly 100 to provide a desired amount of damping when piston head 116 is in the intermediate position, for example and without limitation, and as embodied herein due to vibrational forces, without affecting an amount of damping provided by piston assembly 100 when piston head 116 is moving to the retracted position or the extended position, for example and without limitation, and as embodied herein due to opening or closing of a pivotable body. That is, as discussed herein, first plate 114 and/or second plate 112 can be configured as a disc washer having an aperture 126 sized to select an amount of damping provided by piston assembly 100 while piston head 116 is in the intermediate position. For example, and as embodied herein, first plate 114 can be configured as a disc washer having an aperture 126, and second plate 112 can be configured as a notched washer. In this manner, piston assembly 100 can provide a selectable amount of damping in the intermediate position, and as embodied herein, the selectable amount of damping can be less than the amount of damping provided by piston assembly 100 when piston head 116 moves to the retracted position or the extended position by movement of the piston rod 108.

Alternatively, first and second plates 112, 114 can each be configured as a disc washer having an aperture 126 sized to select an amount of damping provided by piston assembly 100 while piston head 116 is in the intermediate position. In this manner, piston assembly 100 can be configured to provide a selectable amount of damping in the intermediate position, and as embodied herein, the selectable amount of damping in this configuration can be greater than the amount of damping provided when only one of first and second plates 112, 114 is configured as a disc washer, yet still provide less damping than when piston head 116 moves to the retracted position or the extended position by movement of the piston rod 108.

Figure 6:
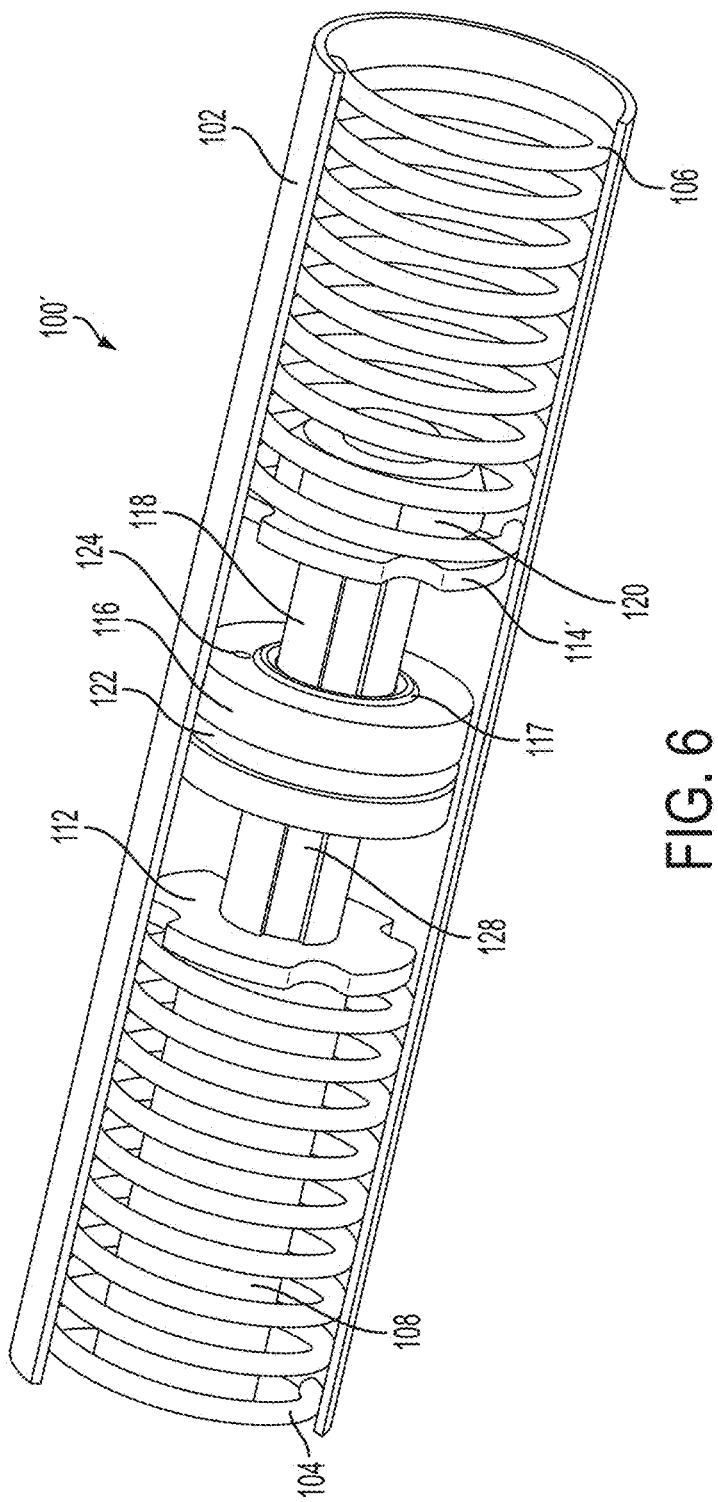
FIG. 6 is a perspective view of an alternative embodiment of a piston assembly in accordance with the disclosed subject matter, with portions of the housing cut away for purpose of illustration.
Figure 7:
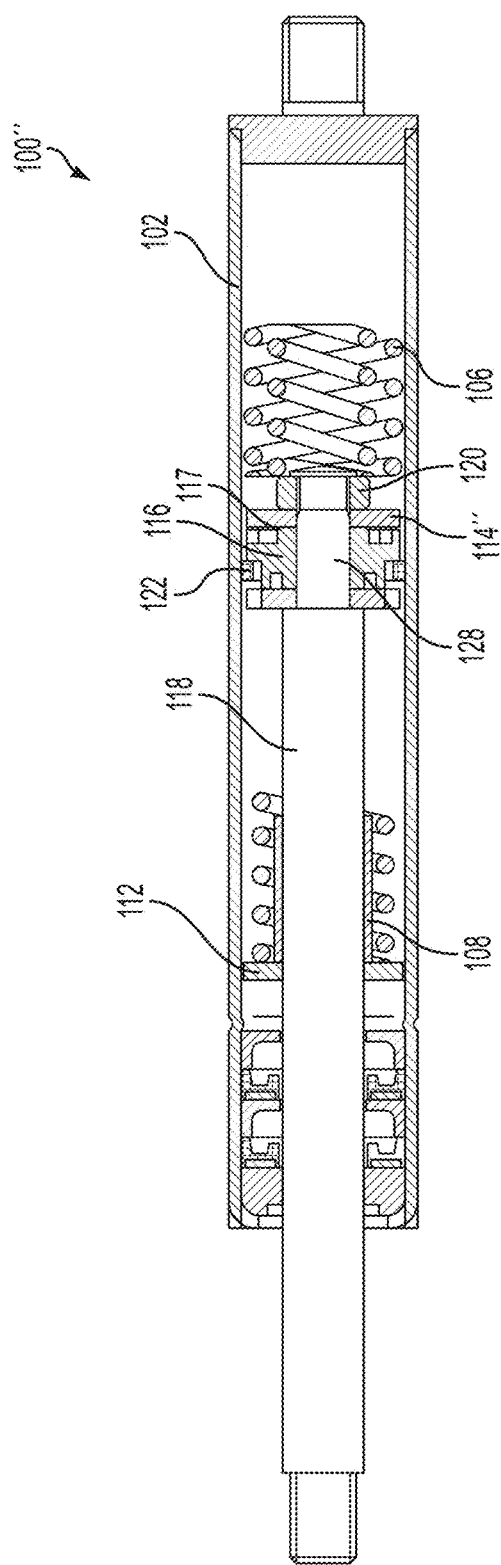
FIG. 7 is a cross-sectional view of the piston assembly of FIG. 6.

As a further alternative, with reference to FIGS. 6 and 7, an alternative embodiment of a piston assembly 100' can include a first plate 114' and second plate 112 each configured as a notched washer. In this configuration, piston assembly 100' can provide little or no damping while piston head 116 is in the intermediate position, and can provide desired damping when piston head 116 moves to the retracted position or the extended position by movement of the piston rod 108. Piston assembly 100' can include any or all of the features described herein with respect to piston assembly 100.

Figure 9:
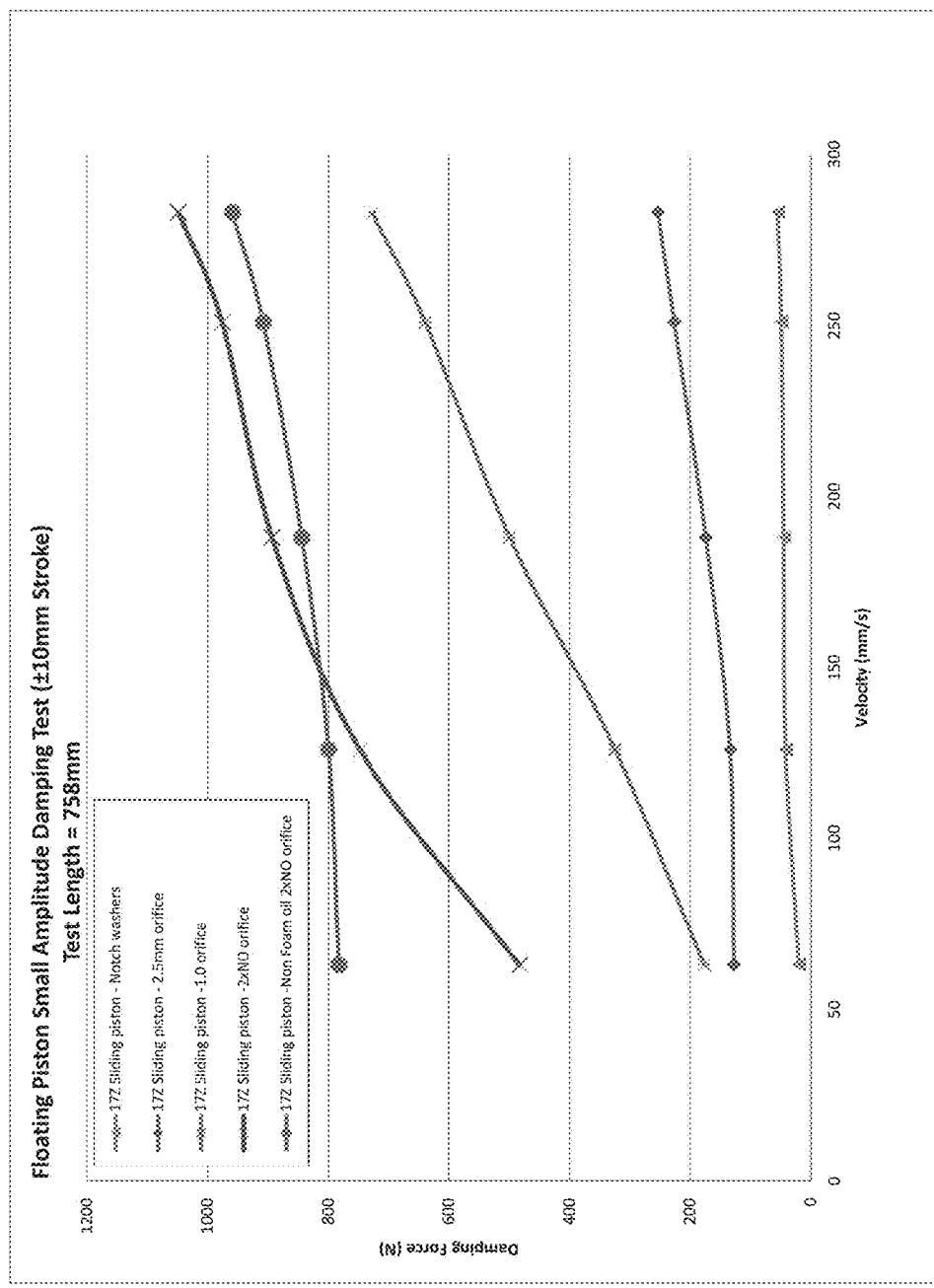
FIG. 9 is a diagram illustrating additional details of exemplary piston assemblies according to the disclosed subject matter.

FIG. 9 is a diagram illustrating a damping force compared to velocity of exemplary piston heads moving within the intermediate position. As shown in FIG. 9, piston assemblies were tested by oscillating a piston head 116 with a 10 mm within the intermediate position. A first configuration included a piston assembly having first and second plates each configured as notched washers. A second configuration included a piston assembly having a first plate configured as a disc washer having a 2.5 mm aperture (also referred to as an orifice) and a second plate configured as a notched washer. A third configuration included a piston assembly having a first plate configured as a disc washer having a 1.0 mm aperture or orifice and a second plate configured as a notched washer. A fourth configuration included a piston assembly having a first plate and a second plate each configured as a disc washer having no aperture or orifice. A fifth configuration included a piston assembly having a first plate and a second plate each configured as a disc washer having no aperture or orifice, and moving within a fluid medium having a greater weight (e.g., an SAE viscosity grade of 50) than the first through fourth configurations (e.g., having an SAE viscosity grade of 10).

Figure 8:
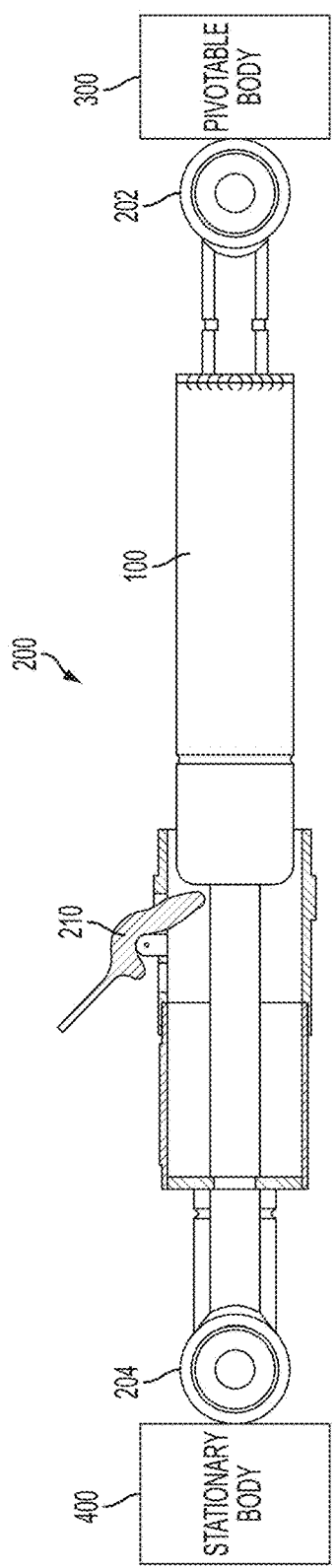
FIG. 8 is a side view of a lift mechanism partially in cross-section, joined to a pivotable body and a stationary body, and including a piston assembly according to the disclosed subject matter.

According to another aspect of the disclosed subject matter, a lift assembly is provided. With reference to FIG. 8, an exemplary lift assembly 200 can include a piston assembly according to the disclosed subject matter. For purpose of illustration and not limitation, and as embodied herein, lift assembly 200 can include piston assembly 100, which can include any or all of the features of piston assembly 100 and/or piston assembly 100' described herein.

Lift assembly 200 can provide a damping force to a pivotable body during pivoting of the pivotable body relative a stationary body between a closed position and an open position is provided. Lift assembly 200 can include a first fitting 202 joined to piston assembly 100 proximate a first lift end. As embodied herein, first fitting 202 can be configured to engage a pivotable body 300. Lift assembly 200 can include a second fitting 204 joined to piston assembly 100 proximate a second lift end. As embodied herein, second fitting 204 can be configured to engage a stationary body 400. First fitting 202 and second fitting 204 can be any suitable fitting, such as, without limitation, a socket for engagement with a ball to form a ball and socket joint. Lift assembly 210 can include a locking element 214. Further details of an exemplary locking element 214 are described in U.S. Patent Application Publication No. 2013/0187315, which is incorporated by reference herein in its entirety.

Referring again to FIGS. 3-5, when first fitting 202 is engaged to pivotable body 300 and second fitting 204 is engaged to stationary body 400, and when pivotable body 300 is urged from the closed position toward the open position to an intermediate position, lift assembly 200 can provide no damping force to pivotable body 300, for example via piston assembly 100 and piston rod 108 as illustrated in FIG. 5. When pivotable body 300 is further urged from the intermediate position toward the open position, lift assembly 200 can provide a damping force to pivotable body 300, for example via piston assembly 100 and piston rod 108 as illustrated in FIG. 3. When pivotable body 300 is urged from the open position to the intermediate position, lift assembly 200 can provide a damping force to pivotable body 300, for example via piston assembly 100 and piston rod 108 as illustrated in FIG. 4. When pivotable body 300 is urged from the intermediate position toward the closed position, lift assembly 200 can provide no damping force to pivotable body 300, for example via piston assembly 100 and piston rod 108 as illustrated in FIG. 5.

The piston assemblies and lift assemblies described herein can be formed from any suitable materials. For example and without limitation, components of the piston assembly and lift assembly can be formed from metals, such as steel and aluminum, polymeric materials, rubber, or any other suitable materials.

As described herein, a piston assembly can be configured to reduce or eliminate damping forces when a pivoting body, such as a hood, is in a closed position and subject to vibration, such as during vehicle operation, while allowing the lift mechanism to provide damping force when the lid is moved between the open and closed positions to assist with opening and closing of the hood.

For example and as described herein, the floating piston can thus allow for little or no damping during vibration, thereby reducing damaging forces to the hood and attachment components. In this manner, full damping can be provided during full compression and full extension travel of the lift mechanism to allow for normal operation of the truck hood. As such, damping can reduced or eliminated entirely using the piston assembly and techniques according to the disclosed subject matter.

The foregoing merely illustrates the principles of the disclosed subject matter. Various modifications and alterations to the described embodiments will be apparent to those skilled in the art in view of the teachings herein. It will thus be appreciated that those skilled in the art will be able to devise numerous techniques which, although not explicitly described herein, embody the principles of the disclosed subject matter and are thus within its spirit and scope.

The invention claimed is:

1. A piston assembly comprising:
a piston housing defining an interior and having a first housing end and a second housing end;
a piston rod having a first rod end extending into the interior and moveable therein between an extended position toward the first housing end and a retracted position toward the second housing end;
a first plate joined to the piston rod proximate the first rod end;
a second plate joined to the piston rod and spaced apart a distance along the piston rod from the first plate; and
a piston head slidably joined to the piston rod between the first plate and the second plate;
a first energy storage member disposed within the housing proximate the first housing end between an end wall of the piston housing and the first plate, and a second energy storage member disposed proximate the second housing end between an opposing end wall of the piston housing and the second plate;
wherein at least one of the first and second energy storage members comprises a spring; and
wherein when the piston rod is in the extended position, the first plate engages the first energy storage member and when the piston rod is in the retracted position, the second plate engages the second energy storage member.

2. The piston assembly of claim 1, wherein each of the first and second plates comprises a washer.

3. The piston assembly of claim 2, wherein at least one of the first plate and second plate comprises a disc washer.

4. The piston assembly of claim 3, wherein the at least one of the first plate and second plate further comprises an aperture defined therethrough.

5. The piston assembly of claim 4, wherein the aperture has a cross dimension selected to provide a selected amount of damping to the piston rod when the piston head is in an intermediate position between the first plate and the second plate.

6. The piston assembly of claim 5, wherein when the piston head is urged from the intermediate position to the retracted position, a first amount of damping is provided to the piston rod, the first amount of damping being greater than the selected amount of damping.

7. The piston assembly of claim 3, wherein the first plate comprises a disc washer and the second plate comprises a notched washer.

8. The piston assembly of claim 3, wherein the second plate comprises a disc washer and the first plate comprises a notched washer.

9. The piston assembly of claim 2, wherein each of the first and second plates comprises a notched washer.

10. The piston assembly of claim 2, wherein each of the first plate and second plate comprises a disc washer.

11. The piston assembly of claim 1, further comprising a sleeve surrounding at least a portion of the piston rod and having a first sleeve end and a second sleeve end, the first plate fixed to the sleeve proximate the first sleeve end and the second plate fixed to the sleeve proximate the second sleeve end, the piston head slidable along the sleeve between the first and second plates.

12. The piston assembly of claim 11, wherein the sleeve has an outer diameter greater than the first rod end and less than a remainder of the piston rod.

13. The piston assembly of claim 1, wherein when the piston rod is urged from the extended position toward the retracted position, the piston head slides along the piston rod from the first plate toward the second plate.

14. The piston assembly of claim 1, further comprising a fastener disposed proximate the first rod end to limit or inhibit movement of at least the first plate toward the first rod end.

15. The piston assembly of claim 1, wherein the first rod end has a reduced diameter relative a remainder of the piston rod.

16. The piston assembly of claim 1, wherein when the piston head is in an intermediate position between the first plate and the second plate, a first amount of damping is provided to the piston rod, and when the piston rod moves from the intermediate position toward the retracted position, a second amount of damping is applied to the piston rod, the first amount of damping being less than the second amount of damping.

17. A lift assembly having a first lift end and a second lift end, the lift assembly configured to provide a damping force to a pivotable body during pivoting of the pivotable body relative a stationary body between a closed position and an open position, the lift assembly comprising:
a piston assembly comprising:
a piston housing defining an interior and having a first housing end and a second housing end;
a piston rod having a first rod end extending into the interior and moveable therein between an extended position toward the first housing end and a retracted position toward the second housing end;
a first plate joined to the piston rod proximate the first rod end;
a second plate joined to the piston rod and spaced apart a distance along the piston rod from the first plate; and
a piston head slidably joined to the piston rod between the first plate and the second plate;
a first energy storage member disposed within the housing proximate the first housing end between an end wall of the piston housing and the first plate, and a second energy storage member disposed proximate the second housing end between an opposing end wall of the piston housing and the second plate;
wherein at least one of the first and second energy storage members comprises a spring; and
wherein when the piston rod is in the extended position, the first plate engages the first energy storage member and when the piston rod is in the retracted position, the second plate engages the second energy storage member; and
a first fitting operably coupled to the piston assembly proximate the first lift end and configured to engage the pivotable body; and
a second fitting operably coupled to the piston assembly proximate the second lift end and configured to engage the stationary body.

18. The lift assembly of claim 17, wherein when the first fitting is engaged to the pivotable body and the second fitting is engaged to the stationary body, and when the pivotable body is urged from the closed position toward the open position to an intermediate position, the lift assembly provides a first damping force to the pivotable body.

19. The lift assembly of claim 18, wherein when the pivotable body is further urged from the intermediate position toward the open position, the lift assembly provides a second damping force to the pivotable body greater than the first damping force.

20. The lift assembly of claim 17, wherein when the pivotable body is urged from the open position to the intermediate position, the lift assembly provides a third damping force to the pivotable body greater than the first damping force.

\* \* \* \* \*